(12) United States Patent
Crichton et al.

(10) Patent No.: US 10,533,832 B2
(45) Date of Patent: Jan. 14, 2020

(54) SPOOL

(71) Applicant: DETNET SOUTH AFRICA (PTY) LTD, Sandton (ZA)

(72) Inventors: Andre Crichton, Sandton (ZA); Phillip Olwage, Sandton (ZA); Johannes Petrus Kruger, Sandton (ZA)

(73) Assignee: DETNET SOUTH AFRICA (PTY) LTD, Sandton (ZA)

( * ) Notice: Subject to any disclaimer, the term of this patent is extended or adjusted under 35 U.S.C. 154(b) by 0 days.

(21) Appl. No.: 16/083,439

(22) PCT Filed: Apr. 6, 2017

(86) PCT No.: PCT/ZA2017/050018
§ 371 (c)(1),
(2) Date: Sep. 7, 2018

(87) PCT Pub. No.: WO2017/181206
PCT Pub. Date: Oct. 19, 2017

(65) Prior Publication Data
US 2019/0101369 A1    Apr. 4, 2019

(30) Foreign Application Priority Data

Apr. 11, 2016   (ZA) ................................. 2016/02408
Jan. 19, 2017   (ZA) ................................. 2017/00448

(51) Int. Cl.
*F42D 1/04*       (2006.01)
*B65H 75/28*      (2006.01)

(52) U.S. Cl.
CPC ............... *F42D 1/04* (2013.01); *B65H 75/28* (2013.01)

(58) Field of Classification Search
CPC .. C06C 5/06; F42D 1/04; B65H 75/14; B65H 75/22; B65H 75/28; B65H 2701/534; G02B 6/4457
USPC .............................. 102/275.2–275.7; 89/1.15
See application file for complete search history.

(56) References Cited

U.S. PATENT DOCUMENTS

| | | | | |
|---|---|---|---|---|
| 4,166,418 A | * | 9/1979 | Calder, Jr. | F42D 1/06 102/275.3 |
| 4,796,830 A | * | 1/1989 | Gelfman | B65H 75/18 242/118.4 |
| 5,246,184 A | * | 9/1993 | Trewhella, Jr. | B65H 75/18 242/125.1 |
| 5,413,046 A | * | 5/1995 | Sobczak | C06C 5/04 102/275.7 |
| 2009/0230228 A1 | | 9/2009 | Penumatcha et al. | |
| 2014/0216289 A1 | * | 8/2014 | Halander | F42D 1/10 102/313 |
| 2014/0366763 A1 | * | 12/2014 | Arguello | F42B 1/028 102/307 |

OTHER PUBLICATIONS

International Search Report and Written Opinion for Application No. PCT/ZA2017/050018 dated Sep. 6, 2017, 11 pages.

* cited by examiner

*Primary Examiner* — John Cooper
(74) *Attorney, Agent, or Firm* — Michael Best & Friedrich LLP

(57) ABSTRACT

A spool for use in a blasting system which includes a coiled signal transmitting conductor connected at one end to a detonator and at a second end to a connector, wherein the detonator and the connector are engaged with retentive formations on a face of a flange of the spool.

7 Claims, 7 Drawing Sheets

SPOOL

CROSS-REFERENCE TO RELATED APPLICATIONS

This patent application is a national stage filing under 35 U.S.C. 371 of International Patent Application No. PCT/ZA2017/050018, filed Apr. 6, 2017, which claims priority to South African Patent Application No. 2016/02408, filed Apr. 11, 2016 and South African Patent Application No. 2017/00448, filed Jan. 19, 2017, each of which are incorporated herein by reference in their entirety.

BACKGROUND OF THE INVENTION

This invention relates to a spool for use in a blasting system and, more particularly, is concerned with a spool which includes an elongate flexible signal transmitting conductor which in use is connected to a detonator.

A flexible signal transmitting conductor such as a conductive wire, a fibre optic cable or a shock tube is often provided, for use in a blasting system, in a coiled and compact form. One end of the conductor is connected to a detonator while an opposing end is connected to an appropriately designed connector. The connector is one of a plurality of similar connectors which are electrically or otherwise coupled to a harness or distribution system. In use each detonator, suspended from the respective signal transmitting conductor, is lowered into a respective borehole to a suitable depth. Thereafter an explosive composition is placed into the borehole with a detonator, a length of the signal transmitting conductor then being embedded in the explosive composition.

A large blasting site can include a significant number of boreholes. The installation of the detonators inside the boreholes and the deployment of the associated signal transmitting conductors can thus constitute a laborious and time consuming undertaking. When a signal transmitting conductor is played out care should be exercised to ensure that the coils do not become ensnared one in the other. The subsequent interconnection of the detonators to a harness, on surface, is also time consuming. The uncoiling of a length of the conductor which is not to be located inside a borehole should be avoided for the uncoiled conductor, on surface, is an impediment to free movement and, moreover, the conductor can be physically damaged due to a variety of factors.

Boreholes at a blast site or at different blast sites may be of different depths and the length of conductor required for each borehole thus can vary from borehole to borehole. Logistical issues are also associated with the storage and transport of a substantial number of coiled signal transmitting conductors.

An object of the present invention is to address, at least to some extent, the aforementioned factors.

SUMMARY OF THE INVENTION

The invention provides a spool for use with an elongate flexible signal transmitting conductor which has a first end configured to be coupled to a detonator and a second end configured to be coupled to a connector, the spool including a first flange with a first inner face and a first outer face, a second flange with a second inner face and a second outer face, and a core which is positioned between and which is connected to the first and second flanges with the first inner face opposing the second inner face and thereby defining an annular space within which most of the elongate flexible conductor is coiled, around the core, the first flange including first and second conductor retention formations on the first outer face, a first exit formation for the conductor and a second exit formation for the conductor whereby said first end and said second end are positionable on the first outer face and are respectively engageable with the first and second retention formations.

The first exit formation may be located at a periphery of the first flange.

The second exit formation may be located at a junction of the first flange and the core.

The core may be removably connected to the flanges. The core may be connected with a clip or screw action, or a combination thereof, to the flanges.

The length of the core, in an axial direction, determines the spacing between the first inner face and the second inner face. The invention provides that the core may be one of a plurality of similar cores which vary only in length from one another. This feature enables a core to be selected so that the annular space between the first and second inner faces is of an adequate volume to accommodate a predetermined length of the elongate flexible signal transmitting conductor.

The first and second inner faces are preferably smooth. The first flange on the first outer face may include detonator locating formations which are engageable with the detonator and connector locating formations which are engageable with the connector.

A first guide formation, at a periphery of the first flange may be configured to receive a portion of a length of the conductor between the first exit formation and the detonator. Similarly a second guide formation on the first outer face may be configured to receive a portion of a length of the conductor between the second exit formation and the connector.

Preferably the first outer face and the second outer face include complementary formations so that the formations on the first outer face of the first flange of a first spool, of the aforementioned kind, are engageable with the formations on the second outer face of the second flange of a second spool, of the aforementioned kind so that the first and second spools can be stacked. This process can be repeated so that a plurality of the spools can be stacked one upon the other with the aforementioned complementary formations on the first and second outer faces engaging one with the other.

To facilitate storage and transport of the spools, once respective detonators have been connected to the spools, the invention also provides a spool assembly which includes a container with a planar surface and a wall at a periphery of the surface, the wall including an inner side which faces towards the planar surface and at least first and second spools, each of the aforementioned kind, on the planar surface, the first spool including, on a peripheral surface, a respective contact formation which abuts a similar respective contact formation on the second spool so that in plan the first spool is orientated oppositely to the orientation of the second spool which is adjacent and abutting the first spool, and wherein the planar surface is sized, relative to the sizes of the spools, so that the spools substantially abut opposed surfaces of the inner side of the wall.

The respective contact formation, on each spool, is located so that within the spool assembly, a longitudinal axis of a first detonator on the first spool is laterally displaced relative to a longitudinal axis of a second detonator on the second spool.

BRIEF DESCRIPTION OF THE DRAWINGS

The invention is further described by way of example with reference to the accompanying drawings in which.

DESCRIPTION OF PREFERRED EMBODIMENTS

Figure 1:
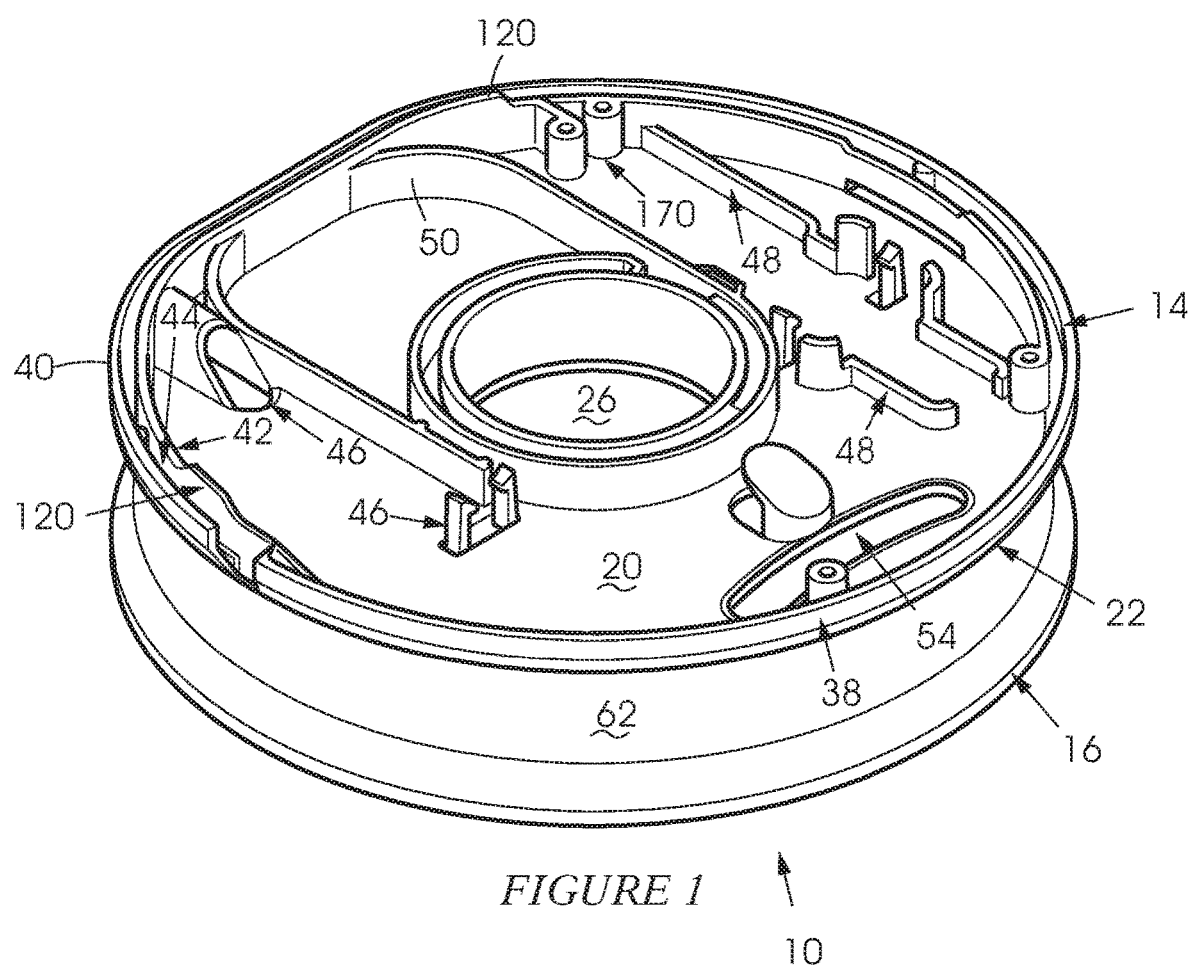
FIG. 1 is a view in perspective of a spool according to the invention.
Figure 2:
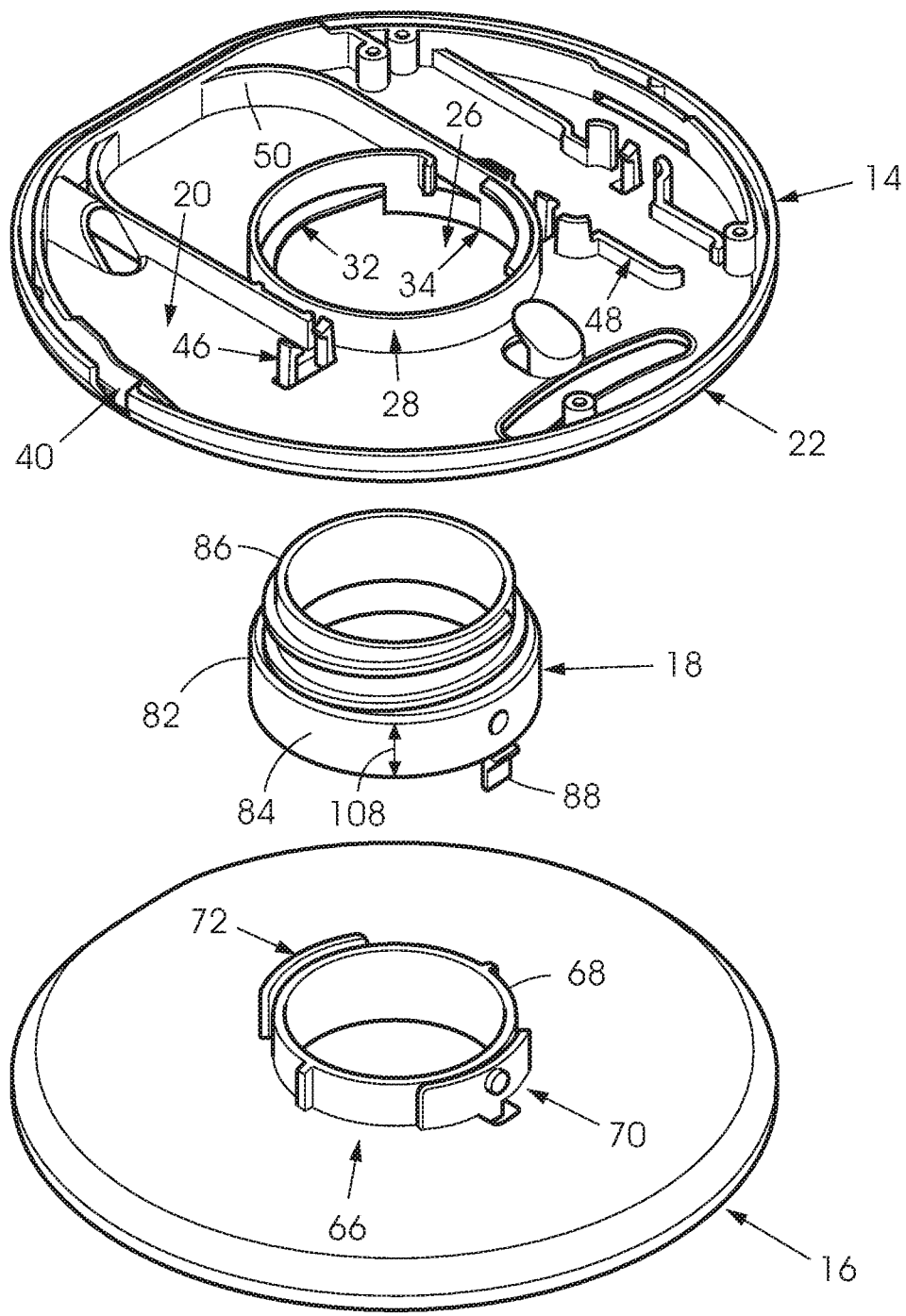
FIG. 2 is a view of the spool of FIG. 1 in exploded form.

FIGS. 1 and 2 of the accompanying drawings illustrate in perspective, in assembled and exploded forms, a spool 10 according to the invention.

The spool 10 includes a first flange 14, a second flange 16 and a core 18.

The first flange 14 has a first outer face 20 and a first inner face 22. A circular aperture 26 is centrally positioned on the first flange 14. The aperture 26 is surrounded by a wall 28 which has a smooth inner surface and, abutting the wall 28, a thread formation 32 (see FIG. 2). An inner conductor exit formation 34 is formed in the wall 28.

A peripheral wall 38 extends around the first flange. The wall is interrupted by an outer conductor exit formation 40. The wall 38 is spaced from and generally parallel to an inner wall 42 which extends around a portion of the periphery of the first flange so that, between opposing surfaces of the walls 38 and 42, a channel 44 is defined.

Detonator locating formations 46 are positioned on one side of the aperture 26. Connector locating formations 48 are positioned on an opposing side of the aperture 26. The inner exit formation 34 leads onto a U-shaped guide formation 50 which is between the locating formations 46 and 48.

A view aperture 54 is formed through the first flange.

Figure 3:
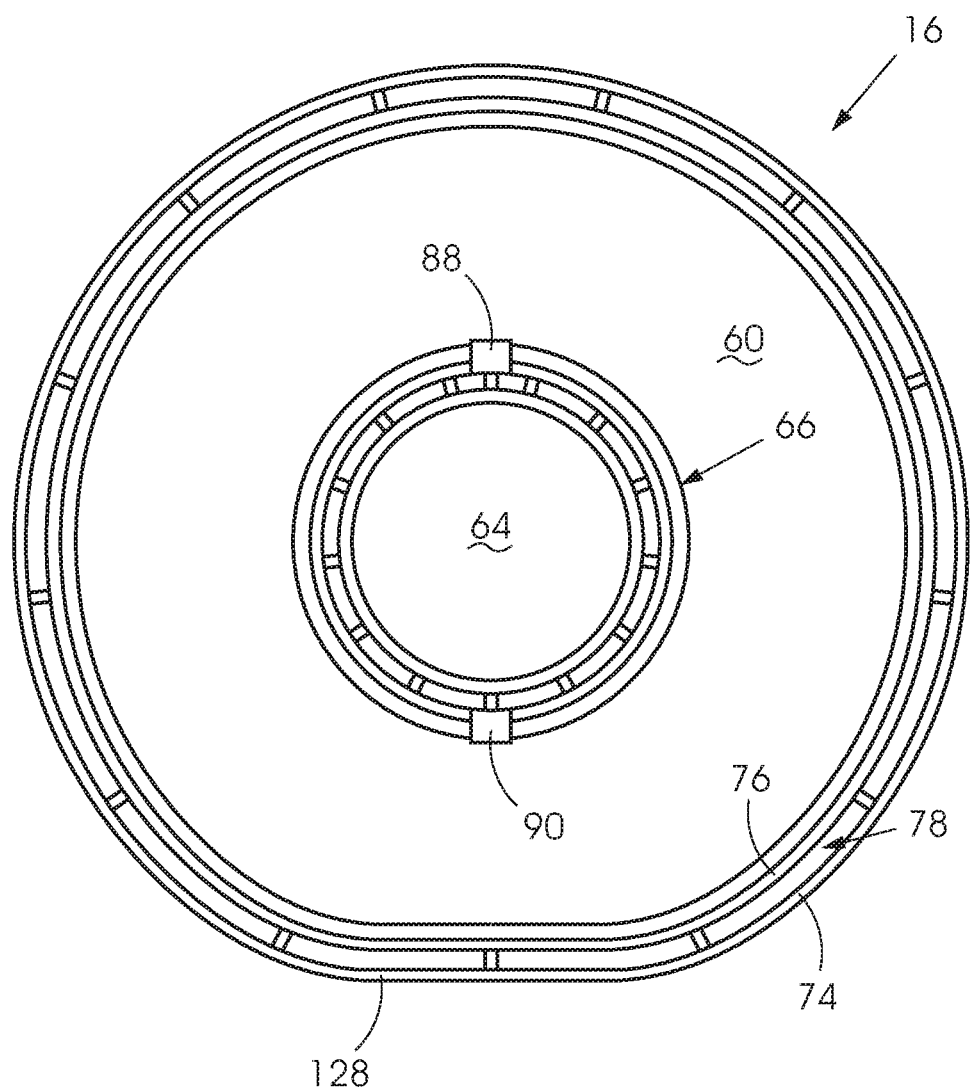
FIG. 3 is a plan view of a second outer side of a second flange of the spool.

The second flange 16 has a second outer face 60 which is shown in FIG. 3 and a second inner face 62—see FIG. 2. The second inner face 62, which surrounds a central aperture 64, is smooth. The first inner face 22 of the first flange, not visible in the drawings, is similar to the second inner face 62 of the second flange in that the first inner face 22 is also smooth.

The aperture 64 is surrounded by a hub 66 formed by a circular wall 68 which is flanked by opposing clip formations 70 and 72 respectively.

Two closely spaced apart walls 74 and 76 respectively, which define a channel 78 between them, extend around a periphery of the second flange 16, on the second outer face 60.

The core 18 has a tubular body 82 with a circular wall 84 and an abutting thread formation 86. Two clip components 88 and 90 respectively extend from the wall 84 on an opposing side to the thread formation 86. The clip formation 90 is not visible in FIG. 2 but is shown for example in FIG. 3.

FIG. 1 shows the spool in an assembled mode wherein the core 18 is positioned between and is connected to the first flange 14 and the second flange 16. The thread formation 86 is screwed, from the first inner face 22 into the aperture 26 engaging with the thread formation 32. The clip formations 88 and 90 are respectively engaged with a clip action with the clip formations 70 and 72 on the second inner face 62—see FIG. 2. In this way an annular volume 100 (see FIG. 7) is formed between the opposing surfaces of the first inner face 22 and the second inner face 60.

Figure 4:
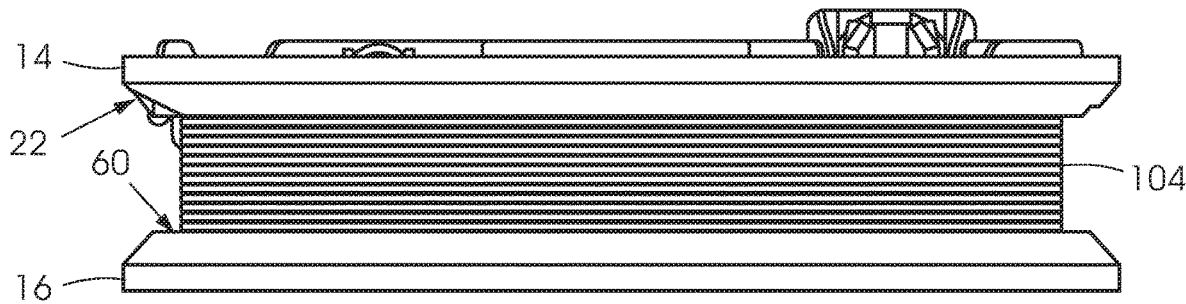
FIG. 4 is a side view of the spool of FIG. 1 with an elongate flexible signal transmitting conductor coiled around a core of the spool.

An elongate flexible signal transmitting conductor 104 is then coiled inside the annular volume (see FIG. 4) around the core 18.

Figure 7:
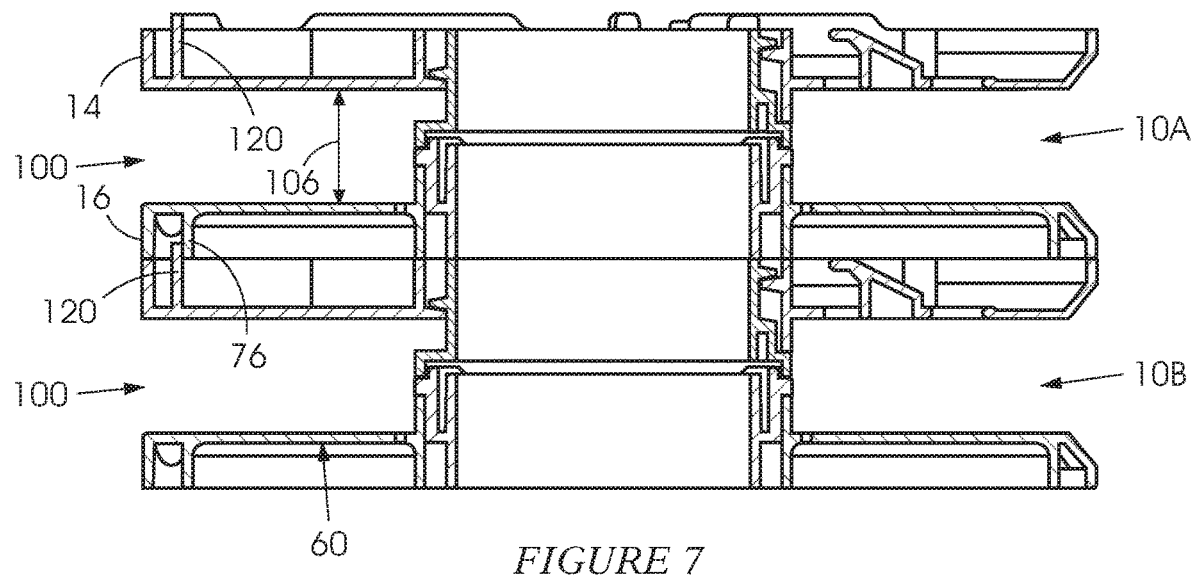
FIG. 7 is a side view in section of two spools, each of the kind shown in FIG. 1, illustrating how the spools are configured so that they can be coupled in a stacked arrangement.

The core 18 is one of a number of similar cores which have different axial lengths 106 (FIG. 7). The different cores are not shown but each core has a thread formation 86 of the kind visible in FIG. 2 and a wall 84. The length 108 of the wall, in an axial direction, is varied in order to vary the axial dimension 106 of the annular volume 100.

The coiling process is such that a portion of the conductor 104 at a first end 110 of the conductor 104 is passed through the first exit formation 40 and is positioned inside the peripheral channel 44 of the first flange 14 and leads to the detonator locating formations 46. A detonator 112 is connected in a known way to the end 110 and is engaged with a clip action with the locating formations 46—see FIG. 5. A portion of the conductor 104 at a second end of the conductor 104 is passed through the second or inner exit formation 34, adjacent the aperture 26, and extends around the U-shaped guide formation 50 on the first outer face 20 to the connector locating formations 48. A connector 118 which is connected in a known manner to the second end of the conductor 104 is engaged with a clip action with the formations 48. The coiled conductor 104 which is located inside the annular volume 100 can be viewed through the aperture 54 in the first flange 14.

FIG. 7 shows that one spool 10A can be stacked on a second spool 10B which is axially aligned with the spool 10A. This process can be extended, if required. The inner wall 42 has a number of projections 120, see FIG. 1, which are engageable with a clip action with the inner wall 76 on the second outer face 60 of an abutting spool so that the spools, axially aligned with each other, are locked together in a detachable manner.

Figure 5:
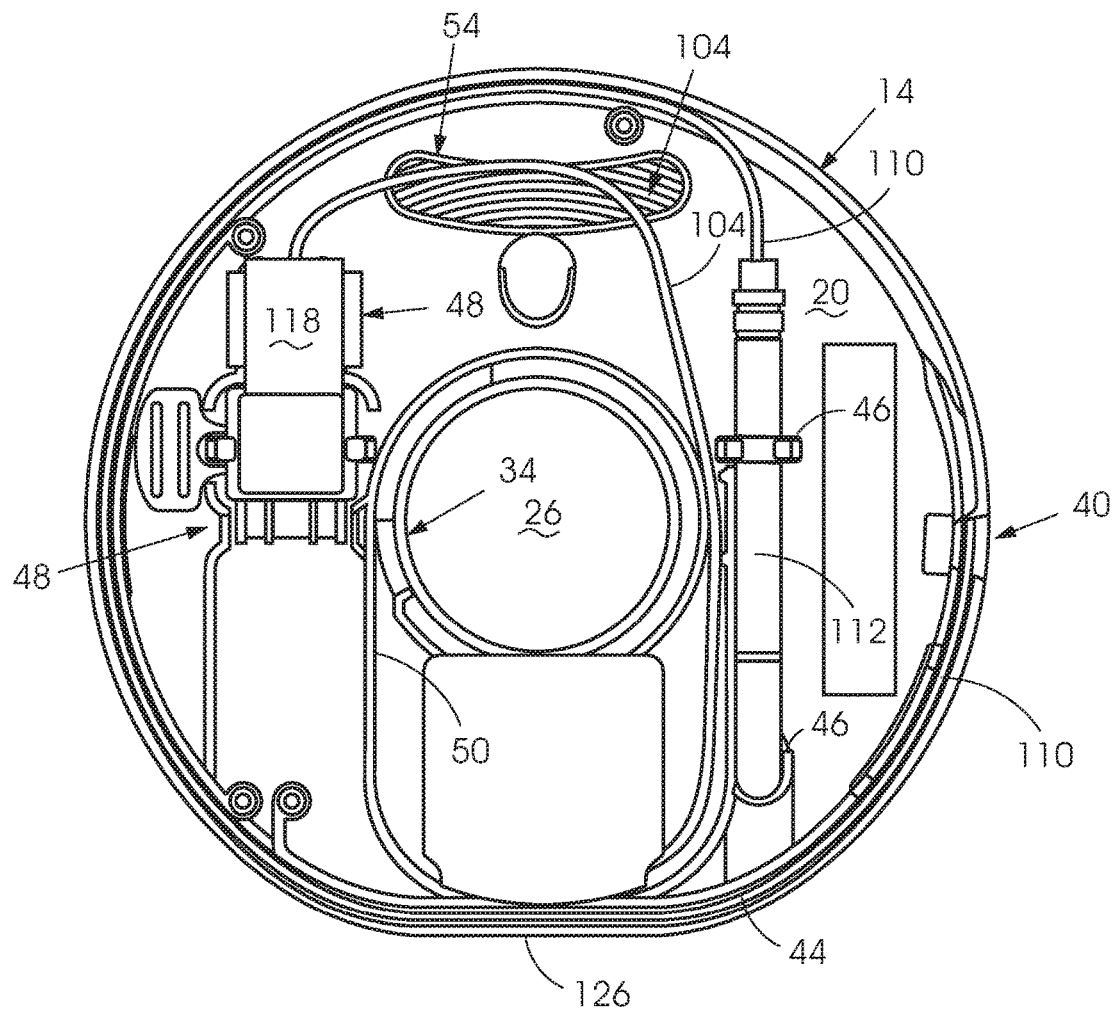
FIG. 5 is a plan view of the spool of FIG. 1 showing a first outer side of a first flange, and a detonator and a connector coupled to a first end and a second end of a signal transmitting conductor which is coiled around a core of the spool.
Figure 6:
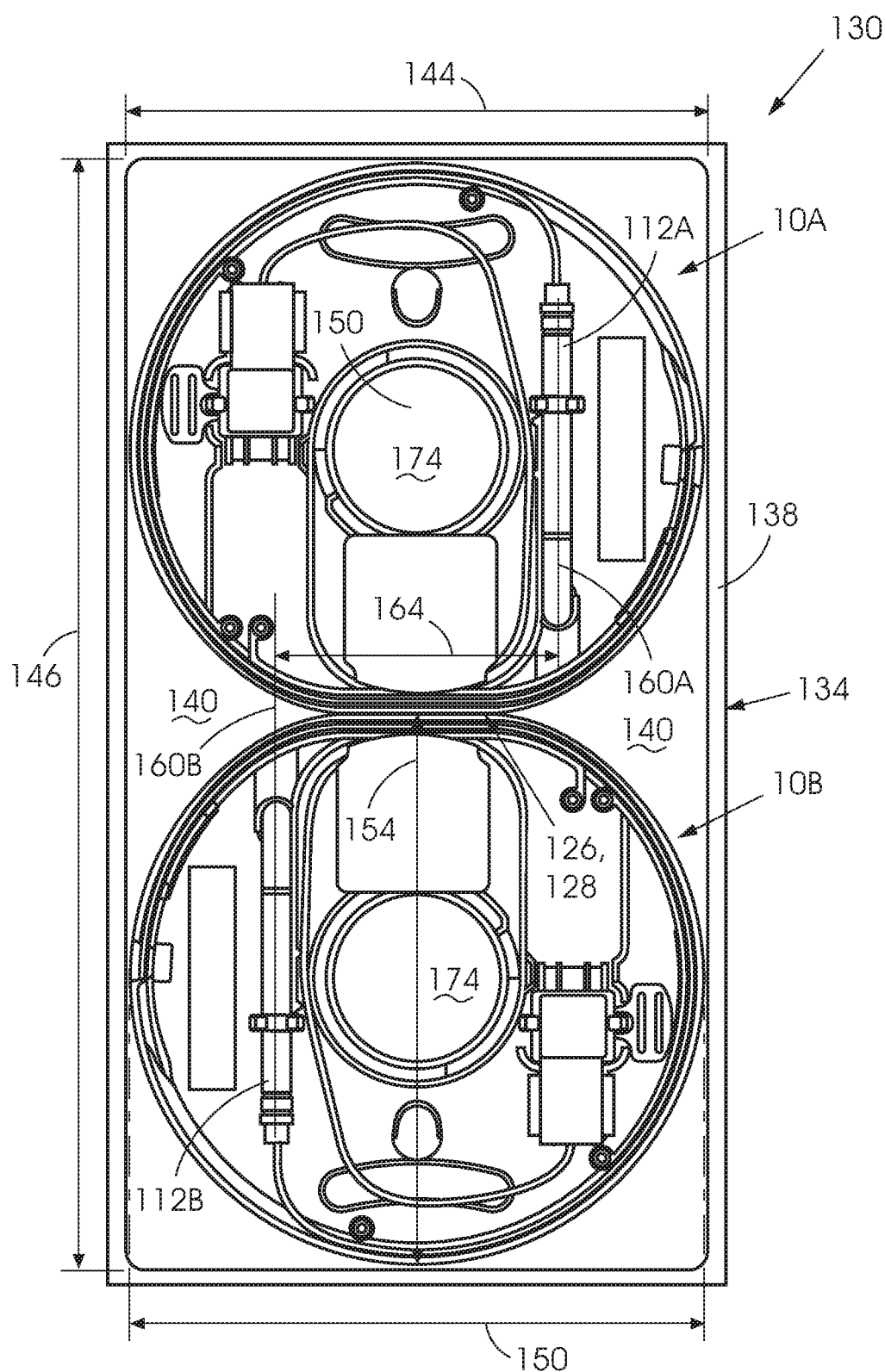
FIG. 6 is a plan view of a spool assembly which includes two spools, each of the kind shown in FIG. 5, showing how the spools are orientated for storage and transport purposes.

FIG. 5 shows the first outer face 20 in plan. FIG. 3 shows the second outer face 60 in plan. Each flange over a bulk of its periphery is circular in outline but a remaining non-circular and substantially flat portion of the periphery defines a contact surface 126 on the first flange and 128 on the second flange. When the spool is fully assembled the contact surfaces 126 and 128 are aligned in an axial sense. The reason for this is evident from an examination of a spool assembly 130 which is shown in FIG. 6. This Figure depicts a portion of a container 134 which has a peripheral wall 138 which surrounds a flat or planar surface 140 upon which a first spool 10A and a second spool 10B are placed. Each spool 10A, 10B is of the kind which has been described hereinbefore. The planar surface has a width 144 and a length 146. The width 144 is slightly greater than the diametrical dimension 150 of the circular periphery of a spool while the dimension 146 is slightly greater than twice a transverse dimension 154 of a spool taken between a central position of the contact surfaces 126 and 128 and an opposing side of the circular periphery of the spool. These dimensional relationships ensure that when the spools are packaged the orientation of the spool 10A is changed by 180° relative to the orientation of a spool 10B, as is shown in FIG. 6. An axis 160A of a detonator 112A on the spool 10A is transversely displaced relative to an axis 160B of a detonator 112B on the spool 10B by a distance 164. This is a significant advantageous safety factor for if a detonator were inadvertently to be ignited the prospect that an adjacent detonator would be triggered is much reduced. The relationship shown in FIG. 6 can be continued for pairs of spools in the elongate direction shown in FIG. 6 and for pairs of spools extending transversely thereto i.e. in the width direction of FIG. 6.

Figure 8:
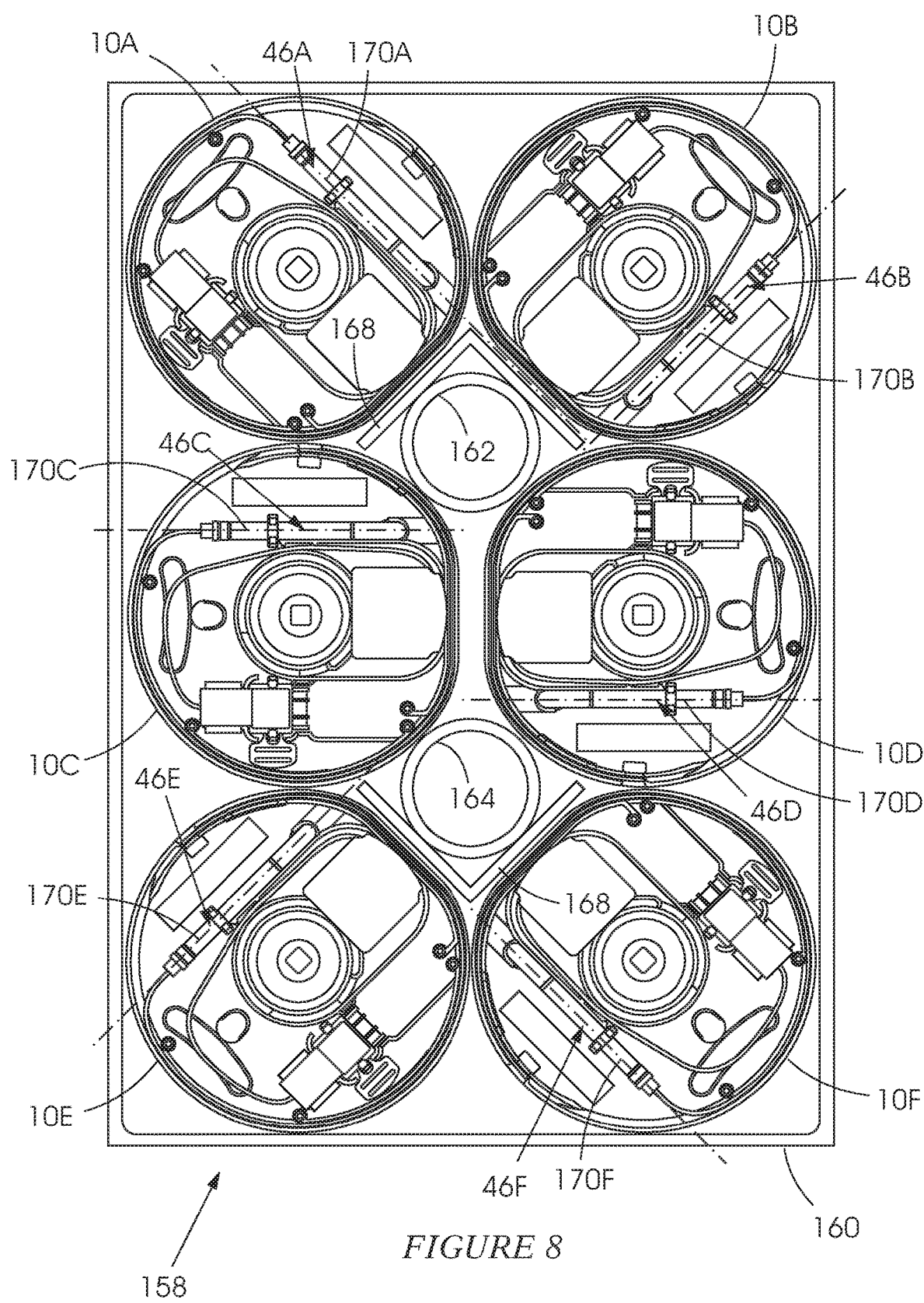
FIG. 8 is a plan view of another spool assembly which provides enhanced protection against the effect of an inadvertent ignition of a detonator on a spool.

FIG. 8 illustrates a different arrangement of six spools 10A to 10F respectively in a container 158 which has a wall 160 dimensioned so that the spools can only be loaded into the container if the spools are placed in the respective orientations which are illustrated. To assist and guide the loading process use is made of two circular partitions 162 and 164 respectively and two angled partitions 166 and 168 respectively.

The flat surfaces 140A, 14B, 140E and 140F of the spools 10A, 10B, 10E and 10F abut respective walls of the angled partitions.

The flat surfaces 140C and 140D of the spools 10C and 10D oppose each other.

The arrangement is such that detonators (not shown) in the various formations 46A to 46F are aligned, as is indicated by lines 170A to 170F respectively, thereby to ensure that the blast effect, arising from an inadvertent firing of one detonator, is directed in such a way that, under the circumstances, the firing of one or more adjacent detonators is unlikely to occur.

The spool of the invention has a number of benefits. As indicated, differently sized interchangeable cores 18 can be used to make up spools of different volumes to accommodate different lengths of conductor. The spool is suited for use with electrical wires, fibre optic cables, shock tubes and the like. Dedicated positions are provided for clipping engagement to the spool of the detonator and the connector which are coupled to opposing ends of the signal carrying conductor. A length of conductor from each respective end of the coiled conductor on the spool can be removed and repacked without decoiling the entire conductor. The connector 118, once clipped in position on the first outer face 20 can be moved to an open position without removing the connector 18 from the spool. When a length of the conductor is deployed from the spool a part of the remaining conductor on the spool can be held in position by clipping the conductor between spaced apart formations 170 on the first outer face 50 (FIG. 1).

The interlocking flanges 76, 120 allow for stacking of spools thereby offering a form of protection for the detonator and the connector on each spool. The detonators which are offset relative to one another when correctly packed into a container, as is shown in FIG. 6 for example, prevent direct propagation from one detonator to an adjacent detonator. Also each detonator 112A, 112B faces "inwardly" and not outwardly, relative to the container in which it is packed. This is an additional safety feature.

The core 18 has a central bore 174 which is sufficiently large to allow deployment from a stake. This facilitates unwinding of the coiled conductor when required.

It is to be noted that the first and second ends of the conductor which respectively go to the detonator and to the connector transition with gradual bends from the coiled conductor to the detonator and the connector respectively. Sharp bends or kinks are thus eliminated.

Once a conductor has been deployed and installed it is possible to disassemble the spool and then to disengage the spool components from the remaining coiled conductor without decoiling the conductor. The spool can thus be recovered for recycling or reuse as may be appropriate.

The invention claimed is:

1. A spool for use with an elongate flexible signal transmitting conductor which has a first end configured to be coupled to a detonator and a second end configured to be coupled to a connector, the spool including a first flange with a first inner face and a first outer face, a second flange with a second inner face and a second outer face, and a core which is positioned between and which is connected to the first and second flanges with the first inner face opposing the second inner face thereby defining an annular space within which most of the elongate flexible conductor is coiled, around the core, the first flange including detonator locating formations and connector locating formations on the first outer face, a first exit formation for the conductor and a second exit formation for the conductor whereby said first end and said second end are positionable on the first outer face and are respectively engageable with a detonator engaged with the detonator locating formations and a connector engaged with the connector locating formations.

2. A spool according to claim 1 wherein the first exit formation is located at a periphery of the first flange and the second exit formation is located at a junction of the first flange and the core.

3. A spool according to claim 2 wherein a first guide formation, at a periphery of the first flange is configured to receive a portion of a length of the conductor between the first exit formation and the detonator, and a second guide formation on the first outer face is configured to receive a portion of a length of the conductor between the second exit formation and the connector.

4. A spool according to claim 1 wherein the core is removably connected to the flanges and wherein the core is one of a plurality of similar cores which vary only in length from one another.

5. A spool according to claim 1 wherein the first outer face and the second outer face include complementary formations so that the formations on the first outer face of the first flange of the spool are engageable with the formations on the second outer face of the second flange of another spool which is identical to the spool so that a plurality of the spools can be stacked one upon the other with the complementary formations on the first and second outer faces engaging with one with the other.

6. A spool assembly which includes a container with a planar surface and a wall at a periphery of the surface, the wall including an inner side which faces towards the planar surface and at least first and second spools on the surface, each spool, having a first end configured to be coupled to a detonator and a second end configured to be coupled to a connector, each spool including a first flange with a first inner face and a first outer face, a second flange with a second inner face and a second outer face, and a core which is positioned between and which is connected to the first and second flanges with the first inner face opposing the second inner face thereby defining an annular space within which most of an elongate flexible conductor is coiled, around the core, the first flange including detonator locating formations and connector locating formations on the first outer face, a first exit formation for the conductor and a second exit formation for the conductor whereby said first end and said second end are positionable on the first outer face and are respectively engageable with a detonator engaged with the detonator locating formations and a connector engaged with the connector locating formations, wherein the first spool includes, on a peripheral surface, a respective contact formation which opposes a similar respective contact formation on the second spool so that in plan the first spool is orientated oppositely to the orientation of the second spool which is adjacent and abutting the first spool, and wherein the planar surface is sized, relative to the sizes of the spools, so that the spools substantially abut opposed surfaces of the inner side of the wall.

7. A spool assembly according to claim 6 wherein the respective contact formation, on each spool, is located so that, within the spool assembly, a longitudinal axis of a first detonator on the first spool is laterally displaced relative to a longitudinal axis of a second detonator on the second spool.

\* \* \* \* \*